United States Patent [19]

Constantine

[11] Patent Number: 4,476,789

[45] Date of Patent: Oct. 16, 1984

[54] METHOD OF AND APPARATUS FOR THE PRODUCTION OF CHARCOAL

[76] Inventor: Anthony Constantine, 59, Zamia Rd., Gooseberry Hill, Western Australia, Australia, 6076

[21] Appl. No.: 413,516

[22] Filed: Aug. 31, 1982

[30] Foreign Application Priority Data

May 31, 1982 [AU] Australia ............................... PF4227

[51] Int. Cl.³ ....................... C10B 21/20; C10B 27/04
[52] U.S. Cl. ..................................... 1.10/229; 201/15; 201/27; 202/126; 202/127; 202/211
[58] Field of Search ................................ 110/229–231; 202/102, 126, 127, 211, 223; 201/2.5, 15, 27

[56] References Cited

U.S. PATENT DOCUMENTS

| | | | |
|---|---|---|---|
| 283,643 | 8/1883 | Nellis | 202/126 |
| 753,376 | 3/1904 | Douglas | 202/127 |
| 2,148,108 | 8/1936 | Curran | 202/102 |
| 3,140,987 | 7/1964 | Warner | 201/27 X |
| 3,875,077 | 4/1975 | Sanga | 202/127 |
| 4,045,299 | 8/1977 | MacDonald | 201/15 X |
| 4,344,820 | 8/1982 | Thompson | 201/15 |

FOREIGN PATENT DOCUMENTS

| | | |
|---|---|---|
| 693982 | 6/1940 | Fed. Rep. of Germany ...... 202/211 |
| 162384 | 2/1949 | Fed. Rep. of Germany ...... 202/211 |
| 885657 | 9/1943 | France ................................ 202/211 |
| WO81/00296 | 2/1981 | PCT Int'l Appl. . |
| 704810 | 3/1954 | United Kingdom . |
| 1233784 | 5/1971 | United Kingdom . |
| 1423440 | 2/1976 | United Kingdom . |

Primary Examiner—Henry C. Yuen
Attorney, Agent, or Firm—Kerkam, Stowell, Kondracki & Clarke

[57] ABSTRACT

The present invention provides a charcoal producing apparatus comprising a combustion chamber, a heating chamber, first passage means interconnecting the combustion chamber and a discharge flue and second passage means interconnecting the heating chamber with the combustion chamber the second passage means being open to the atmosphere and having means for closing it off from the atmosphere. The invention also provides a method for the production of charcoal.

2 Claims, 4 Drawing Figures

METHOD OF AND APPARATUS FOR THE PRODUCTION OF CHARCOAL

This invention relates to improvements in the production of charcoal or the like material such as coke. Throughout this specification the term "charcoal" shall be taken as any material resulting from the destructive distillation of carbonaceous material. The present invention provides an apparatus for the production of charcoal by the destructive distillation of carbonaceous material such as wood which utilises the volatile gases given off by the carbonaceous material. In accordance with one aspect of the present invention there is provided a method for the production of charcoal which comprises initially heating a body of carbonaceous material by burning a combustible material in a combustion chamber until the volatile gases from the carbonaceous material are capable of combustion then feeding the volatile gases to the combustion chamber, the hot combustion gases from the combustion chamber being passed through a passage through and/or surrounding the body of carbonaceous material.

In accordance with the present invention there is also provided a charcoal producing apparatus comprising a combustion chamber, a heating chamber to receive carbonaceous material, a passage extending through and/or past the heating chamber which interconnects the combustion chamber and discharge flue means and a further passage connecting the heating chamber with the combustion chamber, said heating chamber being open to atmosphere and having means for shutting it off from the atmosphere.

The present invention will now be described, by way of example, with reference to the accompanying drawings, in which.

Figure 1:
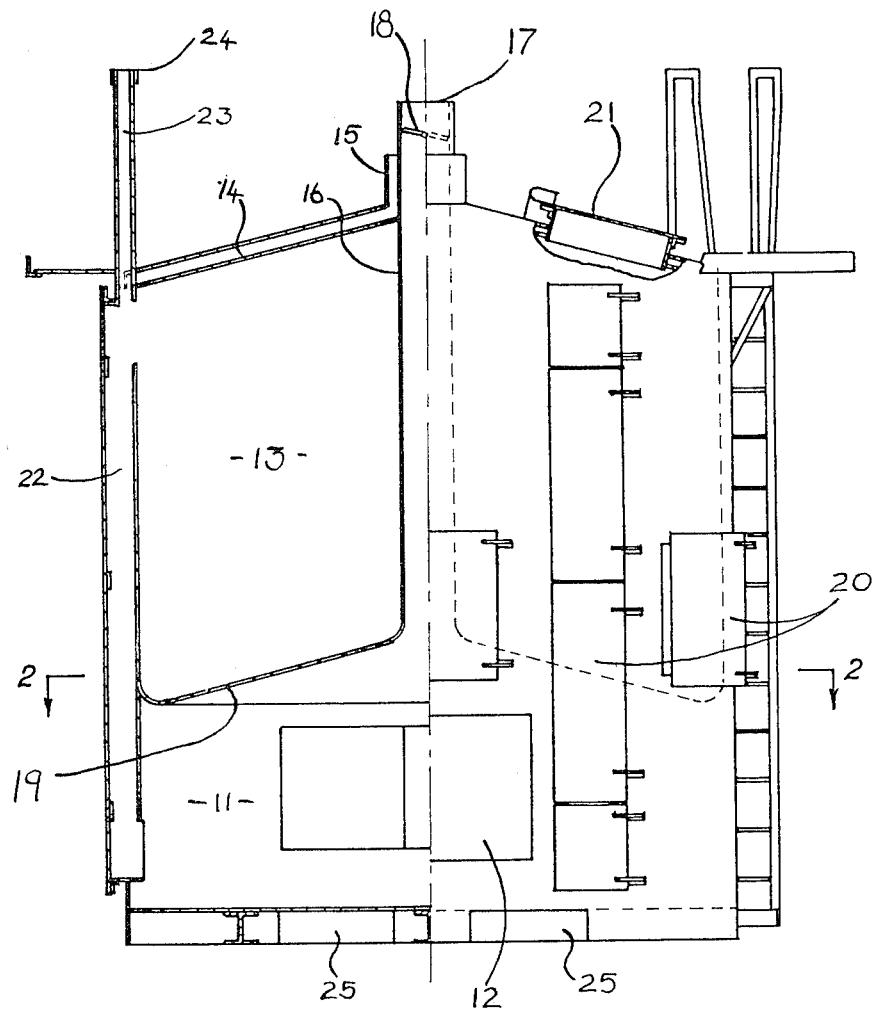
FIG. 1 is a part sectional elevation of one embodiment of apparatus in accordance with the present invention.
Figure 2:
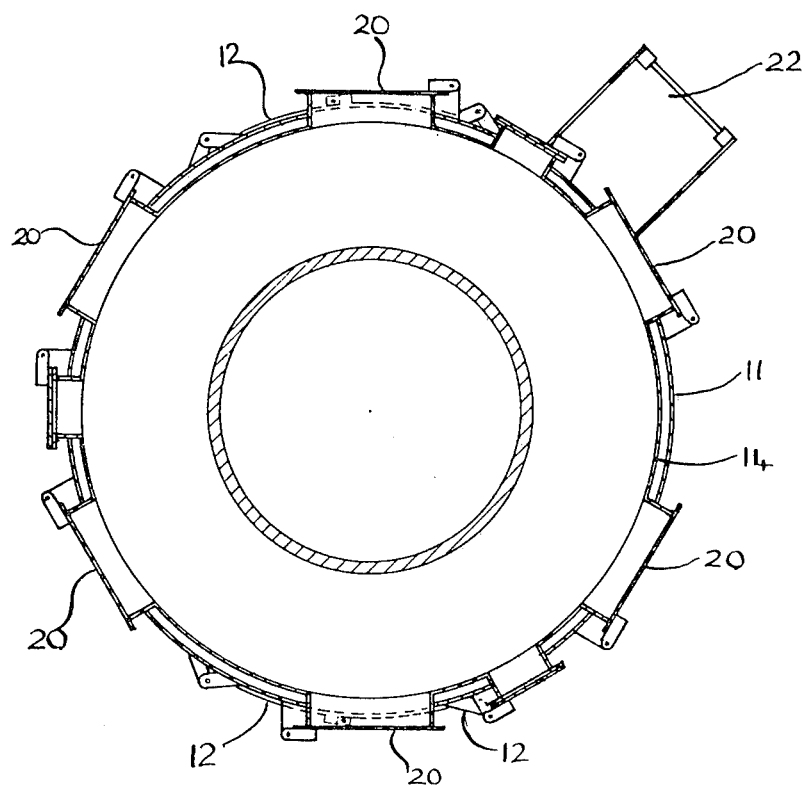
FIG. 2 is a cross-sectional view of the embodiment of FIG. 1 along line 2—2.

In the embodiment shown in FIGS. 1 and 2 of the drawings, the unit is substantially cylindrical and is provided at the bottom with a fire box or combustion chamber 11 which is fed through a pair of doors 12 located at opposite sides of the combustion chamber. A heating chamber 13 is located within the upper portion of the unit so that an annular passage 14 is formed which surrounds the heating chamber 13 and is connected at its lower end to the combustion chamber 11 and at its upper end to a first flue 15. A central passage 16 is formed through the heating chamber 13 to open at its lower end into the combustion chamber 11 and terminate at its upper end in a second flue 17 located coaxially within the first flue 15 and fitted with a damper 18 which may be operated from ground level. Floor 19 of the heating chamber slopes downwardly and outwardly from the central passage 16. A set of discharge doors 20 are located at spaced intervals around the unit and are located at the lower portion of the heating chamber 13 to provide communication past the annular passage 14 into the heating chamber. A pair of charging doors 21 are mounted to the top of the unit and provide communication past the annular passage 14 into the heating chamber 13. A passage 22 connects the upper end of the heating chamber 13 to the combustion chamber 11 and is provided at its upper end with a short flue 23 the upper end of which is fitted with a loose fitting cap 24 to close off the flue 23. Air is supplied to the combustion chamber through ports 25 in the base of the unit.

In operation, the heating chamber 13 is filled with the carbonaceous material such as blocks of wood and a fire is started in the combustion chamber 11 with scrap wood or other suitable material. The loose fitting cap 24 is removed from the flue 23. The hot combustion gases from the combustion chamber pass through the annular passage 14 and the central passage 16 to the flues 15 and 17. The rate of combustion is controlled by the damper 18 and ports 25. The moisture from the wood in the heating chamber 13 passes to atmosphere through the flue 23. When the moisture has been substantially eliminated and the volatiles given off from the wood, as a result of destructive distillation thereof, are capable of combustion, the cap 24 is replaced so that the volatiles are directed to the combustion chamber 11 through passage 22. The introduction of the volatiles into the combustion chamber can, in some cases eliminate the need for further combustible material to be supplied to the combustion chamber.

When the carbonisation of the wood has been completed the heat of the hot body of charcoal within the heating chamber will cause air to flow through the ports 25, the combustion chamber 11, the annular passage 14 and the central passage 16 to accelerate the cooling of the charcoal. When the charcoal has cooled sufficiently it can be removed through the discharge door 20.

Figure 3:
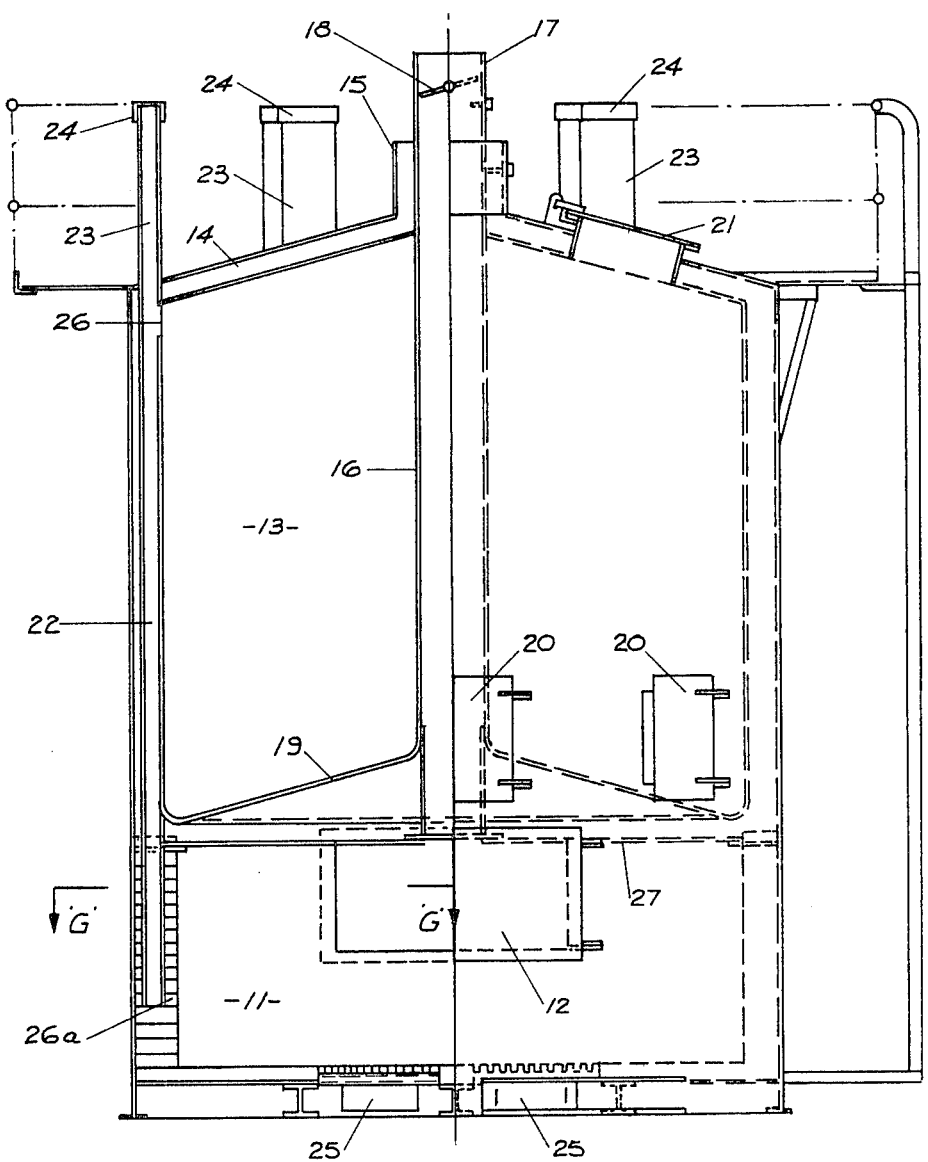
FIG. 3 is a part sectional elevation of another embodiment of apparatus in accordance with the present invention.
Figure 4:
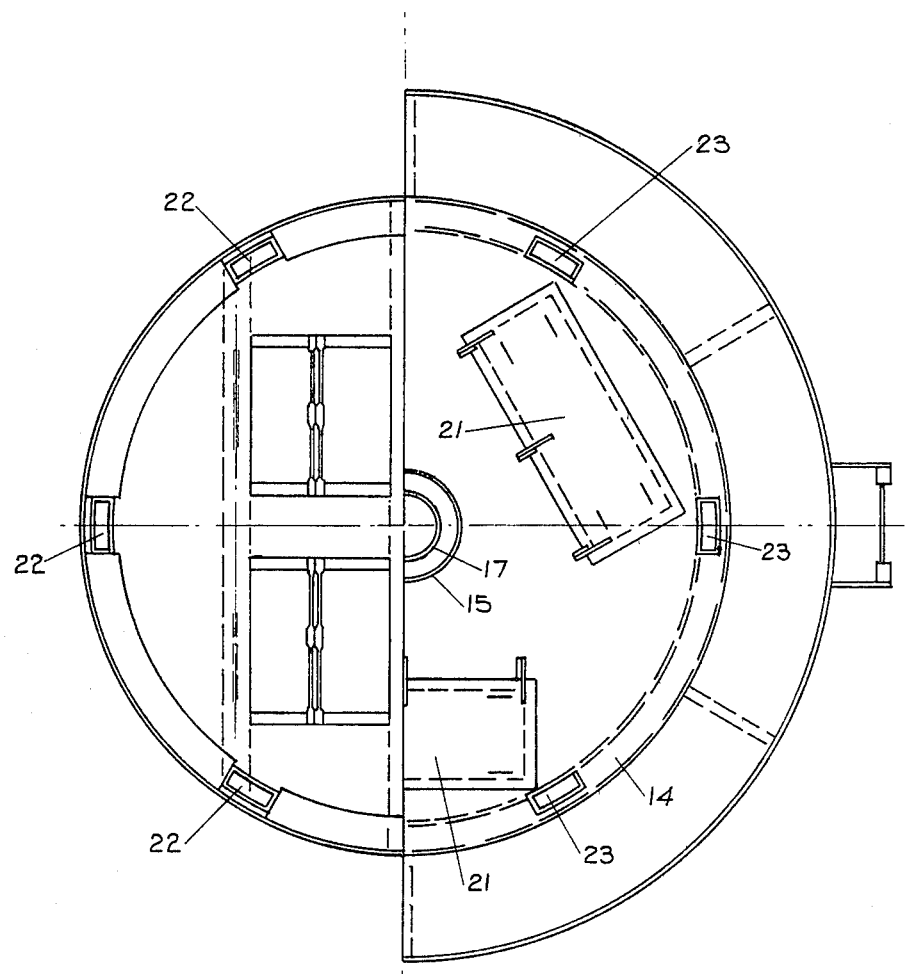
FIG. 4 is a half plan view and half sectional view of the embodiment along line G—G of FIG. 3.

In the embodiment shown in FIGS. 3 and 4 of the drawings, the unit is similar in many respects to the embodiment of FIGS. 1 and 2 and like reference numerals denote like parts. One or several charging doors 21 are mounted to the top of the unit and provide communication past the annular passage 14 into the heating chamber. A plurality of passages 22 connect the upper end of the heating chamber 13 to the combustion chamber 11 and each is provided at its upper end with a short flue 23 the upper end of which is fitted with a loose fitting cap 24 to close off the flue 23. Air is supplied to the combustion chamber through ports 25 in the base of the unit.

As can be seen in the drawings each flue 23 and each passage 22 is connected to the heating chamber 13 through a respective opening 26. The flue 23 extends upwardly to the cap 24 on the one hand and the passage 22 extends downwardly to an aperture 26a leading into the combustion chamber 11 on the other hand. Where each passage 22 extends downwardly to the combustion chamber 11 from the opening 26, the passage 22 is contained completely within the outer wall of the apparatus and has no wall in contact with the ambient air. It is found that by so shielding the passage 22 from the ambient air that it does not become clogged in use so rapidly as when it has a wall in contact with the ambient air.

Also, there is a flat perforated metal plate 27 at the top of the combustion chamber 11 and below the heating chamber 13. It is found that this modification reduces oxidation of the lower wall of the heating chamber 13 by spreading the heat from the combusted mass in the combustion chamber 11 over a wider area.

The embodiment of FIGS. 3 and 4 is operated in the same manner as the embodiment of FIGS. 1 and 2.

The moisture from the wood in the heating chamber 13 passes to atmosphere through the opening 26 and the flues 23. When the moisture has been substantially eliminated and the volatiles given off from the wood, as a result of destructive distillation thereof, are capable of combustion, the cap 24 is replaced so that the volatiles are directed to the combustion chamber 11 through passages 22 and apertures 26a. The introduction of the volatiles into the combustion chamber 11 can, in some cases, eliminate the need for further combustible material to be supplied to the combustion chamber.

The embodiments described above have the following advantages:

(1) the volatile gases from the carbonaceous material are utilised as a heating medium;

(2) substantially uniform heating and cooling of the carbonaceous material by indirect means;

(3) reduction of the polluting effects of the volatile gases which occurs with conventional charcoal producing units;

(4) the degree of operator control required is substantially reduced as compared with existing methods;

(5) The units may be built in varying sizes and can be built such that they are readily portable;

(6) By virtue of their construction the units are self sealing without the need for valves due to the location of the opening from the heating chamber 13 to the passage or passages 22 at the top of the heating chamber 13 and the configuration and position of the passage or passages 22. Therefore, any volatiles given off from the contents of the heating chamber 13 at the end of the heating step will be retained in the space above the contents to prevent the combustion of the contents during the cooling step. This particularly applies to heavier than air components such as carbon dioxide, given off by the contents of the heating chamber 13.

Whilst the invention has been described with particular reference to one specific embodiment many variations are possible.

I claim:

1. A charcoal producing apparatus comprising a combustion chamber, a heating chamber located above the combustion chamber and arranged to receive carbonaceous material, first passage means interconnecting the combustion chamber and discharge flue means, said first passage means comprising an annulus surrounding said heating chamber and at least one axial passage through said heating chamber, second passage means interconnecting the heating chamber and the combustion chamber, said heating chamber being in communication with said second passage means through an opening located in an upper portion of the heating chamber, and said second passage means also being open to atmosphere and having means for shutting it off from the atmosphere, said provisions of the opening located in the upper portion of the heating chamber producing self sealing means in that heavier than air volatiles given off at the end of heating are retained in the space above the body of carbonaceous material to prevent combustion thereof during cooling, wherein said second passage means has no wall in contact with the ambient air, and wherein a perforated plate is located at the top of the combustion chamber and below the heating chamber to spread heat from combustion in the combustion chamber and to reduce oxidation of a wall of the heating chamber adjacent the combustion chamber.

2. Charcoal producing apparatus comprising a combustion chamber, a discharge flue means, a heating chamber located above the combustion chamber and arranged to receive carbonaceous material, first passage means extending at least through the heating chamber and interconnecting the combustion chamber and said discharge flue means, second passage means interconnecting the heating chamber and the combustion chamber, said heating chamber being in communication with said second passage means through an opening located in an upper portion of the heating chamber, and said second passage means also being open to atmosphere, means for shutting off said second passage means from the atmosphere, a body of carbonaceous material in the heating chamber, whereby when the combustible material is placed in the combustion chamber, the combustible material in the combustion chamber is burnt producing hot gases which pass through the first passage means the body of carbonaceous material is heated sufficiently to cause the carbonaceous material to give off volatile material, the second passage means being open to atmosphere initially whereby the volatile material given off is vented to atmosphere until the moisture has been substantially eliminated, whereupon the second passage means is shut off from the atmosphere so that the now combustible volatile material given off is directed through the second passage means from the heating chamber into the combustion chamber for combustion therein, heating being continued until destructive distillation of the body of carbonaceous material is substantially complete at which time heavier than air volatiles given off from the body of carbonaceous material are retained in the heating chamber above the body of carbonaceous material and to thereby prevent combustion of the body of carbonaceous material during cooling, further wherein first passage means of the apparatus comprises an annulus surrounding said heating chamber and at least one axial passage through said heating chamber.

* * * * *